United States Patent
Li et al.

(10) Patent No.: US 8,434,812 B2
(45) Date of Patent: May 7, 2013

(54) VEHICLE VISOR HAVING MIRROR ASSEMBLY

(75) Inventors: Chi Li, Farmington Hills, MI (US); John Andrew Stakoe, Bloomfield Hills, MI (US); Changhong Chen, Canton, MI (US); Haibo Wang, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 13/179,779

(22) Filed: Jul. 11, 2011

(65) Prior Publication Data

US 2013/0016429 A1    Jan. 17, 2013

(51) Int. Cl.
*B60J 3/00* (2006.01)

(52) U.S. Cl.
USPC .......................................... 296/97.5

(58) Field of Classification Search ............... 296/97.2, 296/97.5, 97.8, 97.11, 97.1; 359/844, 872, 359/876
See application file for complete search history.

(56) References Cited

U.S. PATENT DOCUMENTS

| | | | |
|---|---|---|---|
| 4,486,819 A * | 12/1984 | Marcus et al. ............... | 362/492 |
| 4,807,093 A * | 2/1989 | Cisler ........................ | 362/492 |
| 4,895,435 A * | 1/1990 | Shomper ................... | 359/844 |
| 4,934,802 A * | 6/1990 | Fluharty et al. ............. | 359/841 |
| 5,127,700 A * | 7/1992 | Joe et al. .................... | 296/97.5 |
| 5,192,110 A * | 3/1993 | Mykytiuk et al. ........... | 296/97.8 |
| D413,293 S * | 8/1999 | Haas et al. ................. | D12/191 |
| 6,527,329 B2 * | 3/2003 | Bauer et al. ................ | 296/97.4 |
| 6,902,284 B2 | 6/2005 | Hutzel et al. | |
| 7,097,314 B1 | 8/2006 | Darling | |
| 7,686,464 B2 * | 3/2010 | Compton et al. ............ | 359/866 |
| 2009/0218845 A1 * | 9/2009 | Rockafellow ............... | 296/97.5 |

FOREIGN PATENT DOCUMENTS

KR         100847975 B1      7/2008

OTHER PUBLICATIONS

"Conversation Mirror Benefits," www.carinsurancequote.not/conversation-mirror-benefits.html, Copyright 2011, 2 pages.
"2011 Nissan Quest Designed to Take on the Toughest and Most Rewarding Job on the Planet—Parenting," www.velocityjournal.com/journal/2011/nissan/17864/releases/1899.html, Copyright 1998-2011 Velocity Automotive Journal, 4 pages.
"2005 Toyota Sienna," www.cars.com/toyota/sienna/2005/reviews/, reviewed by Joe Wiesenfelder, Nov. 12, 2004, 6 pages.
"2010 Honda Odyssey Review," www.vehix.com/car-reviews/2010/honda/odyssey, reviewed by Michael Harley, Copyright 2002-2011 vehix.com, 2 pages.

* cited by examiner

*Primary Examiner* — Glenn Dayoan
*Assistant Examiner* — Pinel Romain
(74) *Attorney, Agent, or Firm* — Vichit Chea; Price Heneveld LLP

(57) ABSTRACT

A vehicle visor is provided that includes a mirror assembly. The visor body has a first side and a second side and pivots between a stowed position and a downward use position. The visor body further includes a mirror assembly located on the visor body. The mirror assembly includes a conversation mirror that is extendable from a first side of the visor body for viewing from the first side of the visor body, and is stowable within the visor body for viewing through an aperture from the second side of the visor body. The mirror may serve as a vanity mirror.

24 Claims, 6 Drawing Sheets

US 8,434,812 B2

VEHICLE VISOR HAVING MIRROR ASSEMBLY

FIELD OF THE INVENTION

The present invention generally relates to an automotive sun visor for a vehicle, and more particularly relates to a vehicle visor having a mirror assembly.

BACKGROUND OF THE INVENTION

Automotive vehicles are commonly equipped with a pair of sun visors generally connected to the roof or headliner forward of the driver and front passenger seats. Each visor is typically connected via a pivot mechanism and may be actuatable between stowed and use positions to provide shade from sunlight. The conventional visor typically includes a vanity mirror assembly installed on one side of the visor body. The vanity mirror assembly typically has a planar mirror and one or more vanity lights and lenses to provide lighting sufficient to enable a user to view an image in the mirror. Some vehicles have also employed conversation mirrors typically mounted on the overhead console in an attempt to provide viewing of passengers such as those seated in rear occupant positions for conversation and monitoring activities in rear seats such as babies in their own baby seats.

SUMMARY OF THE INVENTION

According to one aspect of the present invention, a vehicle visor is provided that includes a visor body having a first side and a second side. The visor also has a conversation mirror assembly located on the visor body. The vehicle visor also includes a conversation mirror assembly having a conversation mirror that articulates between a stowed position within the visor body and an extended position extending from the visor body.

According to another aspect of the present invention, a vehicle visor is provided that includes a visor body having a first side and a second side, wherein the visor body pivots between a stowed position and a downward use position. The vehicle visor further includes a mirror assembly comprising a mirror located on the visor body. The mirror is extendable from the visor body and may be viewed from either the first side or second side of the visor body.

According to a further aspect of the present invention, a vehicle visor is provided that includes a visor body having a first side and a second side, wherein the visor body pivots between a stowed position and a downward use position. The vehicle visor further includes a mirror assembly located on the visor body and comprising a mirror that is extendable from the first side of the visor body for viewing and stowable within the visor body for viewing through an aperture from the second side of the visor body.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
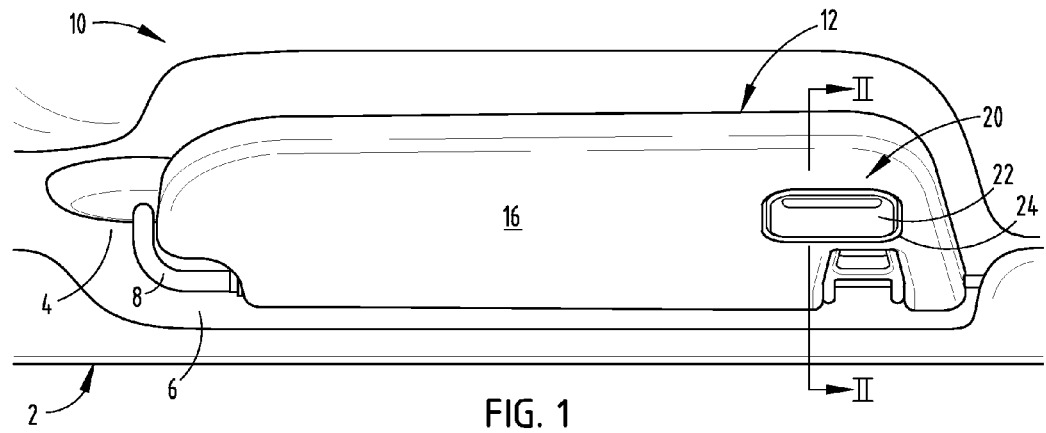
FIG. 1 is a perspective view of a sun visor in a stowed position in a vehicle and having a conversation mirror shown in a stowed position, according to a first embodiment.
Figure 6:
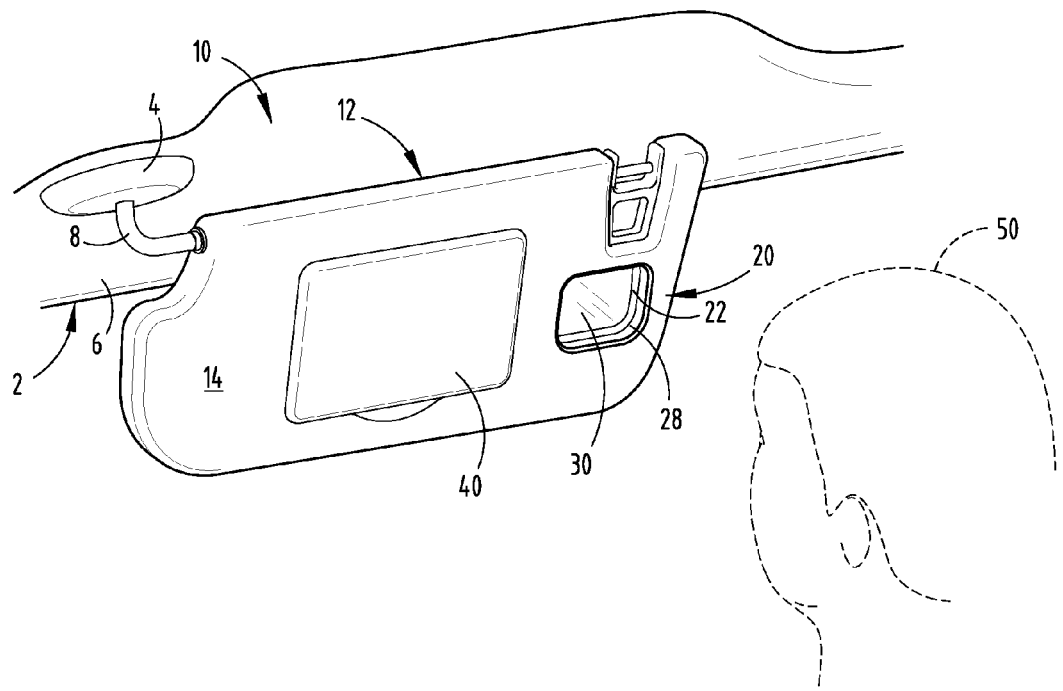
FIG. 6 is a perspective view of the sun visor shown in a downward use position illustrating use of the conversation mirror from the first side of the visor body.

For purposes of description herein, the terms "upper," "lower," "right," "left," "rear," "front," "vertical," "horizontal," and derivatives thereof shall relate to the visor and lighting assembly as oriented in FIGS. 1 and 6. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-7, a vehicle sun visor 10 is generally shown having a conversation mirror assembly 20 providing a conversation mirror 30 that can be viewed from both the first and second sides of the visor, according to a first embodiment. The conversation mirror is defined as a mirror that provides a wide viewing angle to enable a viewer to view a large area. The conversation mirror is shown and described herein as a mirror with a convex surface to allow the view of a wide angle image, in contrast to a flat or planner mirror typically used in the visor vanity pack. The conversation mirror 30 has a curvature such as convex shape that offers wide angle viewing, according to one embodiment. According to another embodiment, the conversation mirror may have a lens provided on a planar mirror surface to provide the wide viewing area. The conversation mirror 30 enables a front seat passenger to view rear seated passengers.

Figure 3:
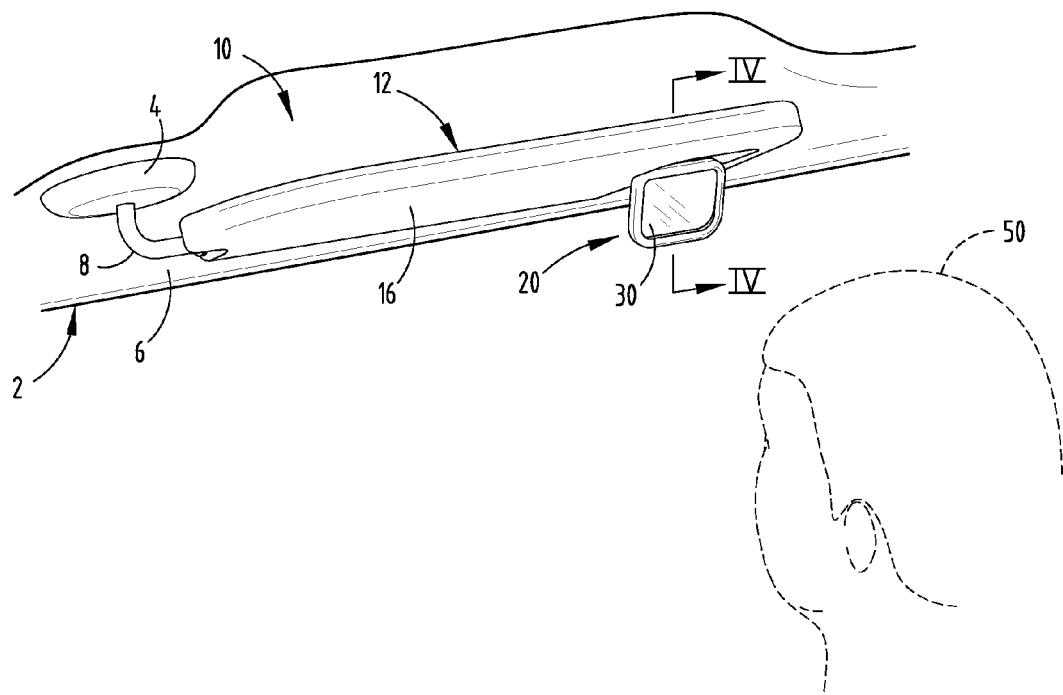
FIG. 3 is a perspective view of the sun visor showing the conversation mirror in an extended use position.

The vehicle sun visor 10 is shown installed in a passenger compartment of a vehicle 2 generally in a region forward of a front passenger seat of the vehicle 2. The visor 10 has a visor body 12 with a pivoting connector 8 that connects to a roof mounted bracket 4 generally in the headliner 6 or roof of the vehicle 2. It should be appreciated that one or more sun visors 10 may be located at any of a number of locations in the vehicle 2 and may be employed on any of a number of types of vehicles to provide sunshade in various positions including blocking light from the front windshield or from a side window which may be achieved by pivoting the visor body about connector 8. The sun visor 10 is designed to be tilted upright to a generally horizontal stowed position as shown in FIGS. 1 and 3, or may pivot downward to a generally vertical deployed use position as shown in FIG. 6.

The vehicle sun visor 10 includes a visor body 12 having a conventional visor shape with a first or front side 14, a second or rear side 16 generally parallel to and opposite of first side 14, and a peripheral edge 18 connecting the first side 14 to the second side 16. The visor body 12 may be made of conventional visor materials including, but not limited to, polyurethane and fabric. The connector 8 is a pivotable mechanism that extends from the visor body 12 and connects the visor 10 to the roof mounted bracket 4 and allows the visor body 12 to be pivoted between the stowed position illustrated in FIGS. 1 and 3 and downward use position illustrated in FIG. 6. The connector 8 may also allow the visor body 12 to be rotated about ninety degrees (90°) from a position generally in front of the vehicle front windshield and a position generally in front of a side window of the vehicle 2.

The visor body 12 may include a vanity mirror assembly 40 shown assembled onto the front or first side 14 of the visor body 12. The vanity mirror assembly 40 may include a vanity mirror equipped with or without a cover or lid. The lid may include a pivoting lid or a sliding lid. The vanity mirror typically may include a substantially planar mirror for providing a reflection to a person positioned in front of the mirror. Additionally, the visor body 12 may include one or more lights for providing vanity lighting.

The visor body 12 may generally be made of a structurally supportive substrate. The visor substrate may include a polypropylene clamshell having a hollow interior or core, according to one embodiment. The visor body 12 may further include a fabric covering which contacts and surrounds the substrate. The fabric covering may include a polyester fiber, according to one embodiment. The visor body has an aperture 28 extending through the entire depth of the visor body for receiving the conversation mirror assembly 20. The aperture 28 may be integrally molded in the substrate or may be otherwise formed such as by cutting or otherwise removing substrate material.

Figure 2:
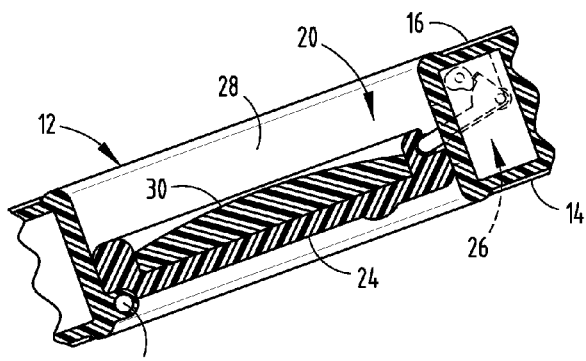
FIG. 2 is a cross-sectional view taken through lines II-II of FIG. 1.
Figure 4:
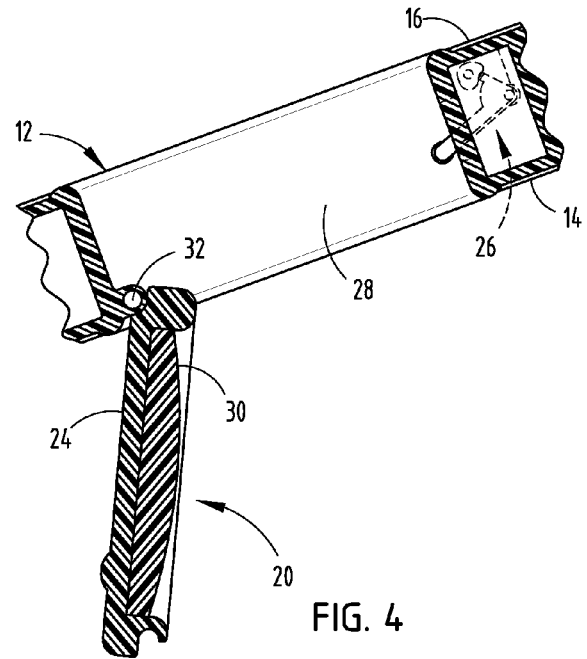
FIG. 4 is a cross-sectional view taken through lines IV-IV of FIG. 3.

Referring to FIGS. 1 and 2, the conversation mirror assembly 20 is shown generally having a frame or bezel 22 disposed within the aperture 28 in visor body 12. The conversation mirror 30 may be made of glass, reflective polymeric material, or any other material having reflective properties suitable for use as a mirror. The frame 22 is sized to receive the conversation mirror 30 which may pivot to extend outward relative to the frame 22 and visor body 12. The conversation mirror 30 includes a backing member 24 as seen from the rear side 16 of visor body 12 when the conversation mirror assembly 20 is in the stowed position. The conversation mirror assembly 20 includes a latch 26 for providing a latchable engagement between the backing member 24 and the frame 22 to latch the conversation mirror 30 in the stowed position within visor body 12. The latch 26 may be a user depressible push/push latch wherein a user forcibly pushes on the backing member 24 to unlatch the mirror 30 and backing member 24 from latched engagement with frame 22, and further pushes the backing member 24 back into engagement with the frame 22 to latch the mirror 30 and member 24 in its stowed position, according to one embodiment. To deploy the conversation mirror 30 when the visor body 12 is in the upward stowed position, a user may actuate the push/push latch 26 which unlatches the conversation mirror 30 and backing member 24 and allows the conversation mirror 30 to pivot about pivot 32 to a downward use position as shown in FIGS. 3 and 4. To stow the conversation mirror 30, a user simply pushes the mirror 30 back to its stowed position.

In the downward use position shown in FIGS. 3-5, the conversation mirror 30 is viewable from just below the stowed visor body 12 to enable a viewer such as passenger 50 to view objects within a wide field of view, including other passengers 60 seated rearward in the vehicle 10 such as for conversation purposes and for monitoring children's activities to name a couple of examples. The conversation mirror 30 has a convex shape to provide a wide field of view. According to one embodiment, the conversation mirror 30 has a spherical shape portion. In the embodiment shown, the conversation mirror assembly 20 is located near one side, namely the right side as shown in FIG. 1 of the visor body 12, such that it is off to the side to enable viewing generally from a position offset to the side of the viewer. According to one example, the conversation mirror 30 has a viewing window size of approximately fifty millimeters (55 mm) by thirty millimeters (30 mm). However, it should be appreciated that the size, shape and location of the conversation mirror 30 on the visor body 12 may otherwise be configured, according to further embodiments. When use of the conversation mirror 30 is no longer desired, a user may simply pivot the conversation mirror back to the stowed position until it latched via latch 26.

Figure 5:
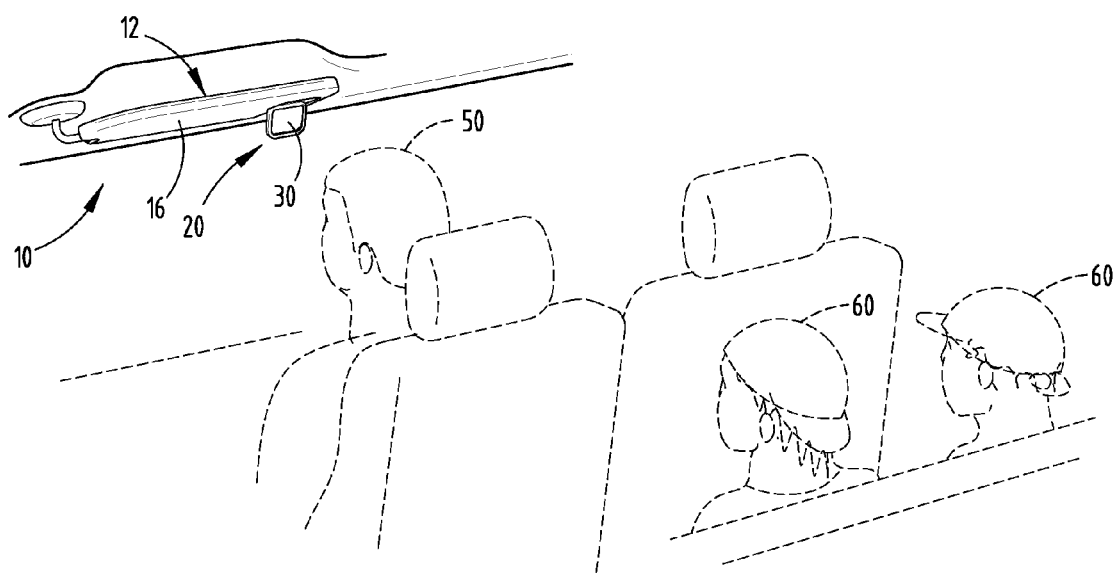
FIG. 5 is a perspective view of the passenger compartment of the vehicle further illustrating the use of the deployed conversation mirror on the visor.
Figure 7:
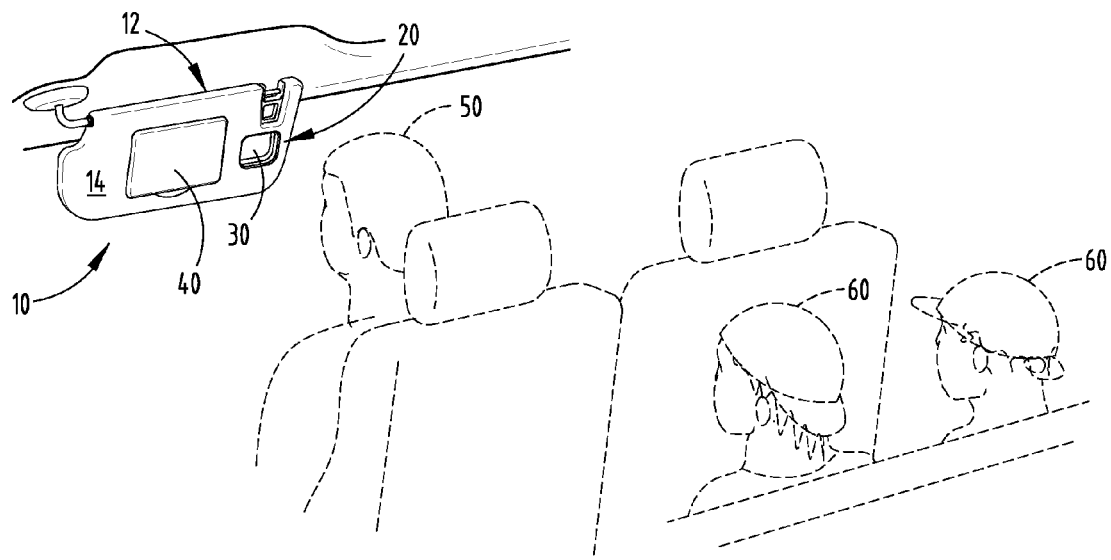
FIG. 7 is a perspective view of the passenger compartment of the vehicle further illustrating use of the conversation mirror when the visor is in the downward use position.

The conversation mirror assembly 20 advantageously may be employed when the visor body 12 is in either the upward stowed position as shown in FIGS. 1, 3 and 5, or the downward use position as shown in FIGS. 6 and 7. In the upward stowed position of visor body 12, the conversation mirror 30 is extendable from the visor body 12 by pivoting outward about pivot 32 to a viewing position generally seen from the second side 16 of visor body 12. In the downward use position of the visor body 12, the conversation mirror 30 is readily viewable from the first side of the visor body 12 through aperture 28 provided in the visor body 12. Aperture 28 extends all the way through the visor body 12 such that the conversation mirror 30 while it is stowed within the visor body 12 is still viewable from the front side 14 of visor body 12. Accordingly, the conversation mirror assembly 20 advantageously may be used for mirror viewing from either side of the visor body 12.

The vehicle visor 10 according to the first embodiment, advantageously provides for a conversation mirror assembly 20 that advantageously is deployable within the visor body 12 and that may be useable to view the conversation mirror 30 from either the front side 14 or rear side 16 of the visor body 12. The conversation mirror assembly 20 enables a user to utilize the conversation mirror 30 when the visor body 12 is in the stowed position. When sunshade is desired and the visor body is in the downward use position, the conversation mirror 30 may likewise be used. The integration of the conversation mirror 30 into the sun visor 12 and use in multiple use positions of the sun visor 10 provides for an integrated assembly.

Figure 8:
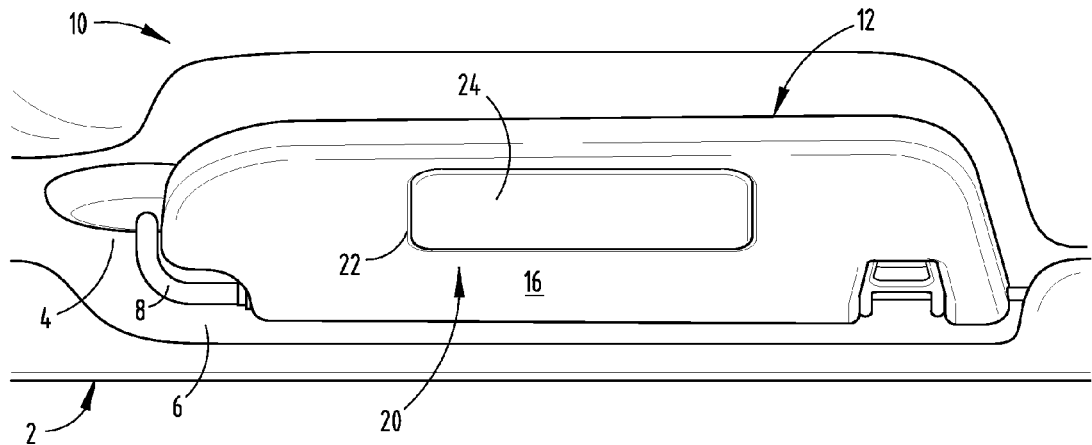
FIG. 8 is a perspective view of a sun visor in a stowed position in a vehicle having a vanity and/or conversation mirror shown in a stowed position, according to a second embodiment.
Figure 9:
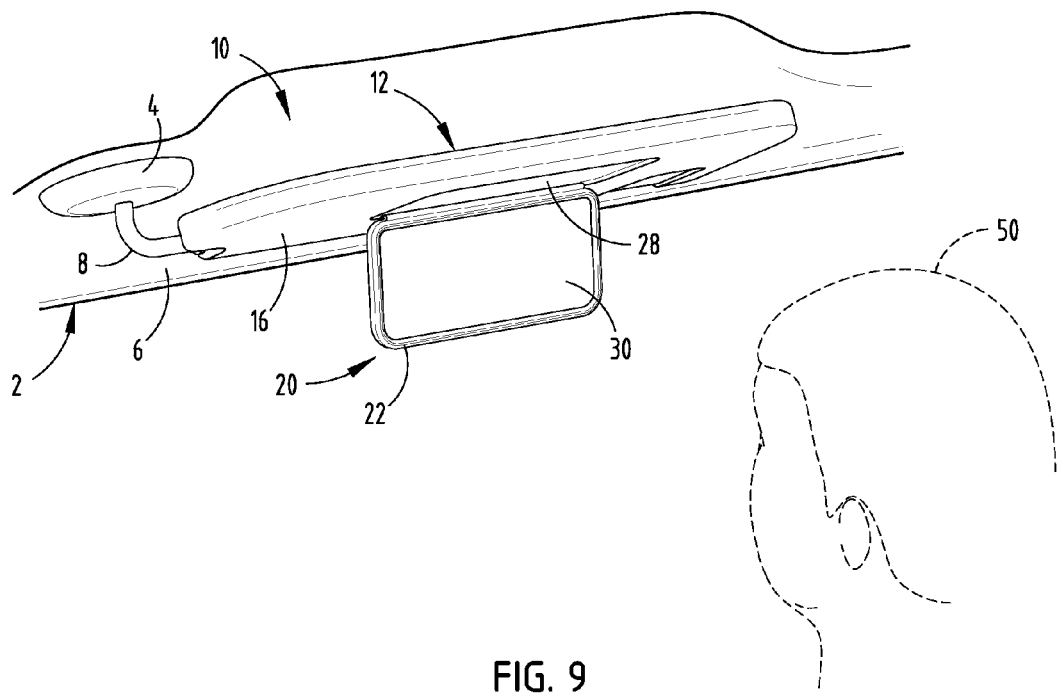
FIG. 9 is a perspective view of a sun visor showing the vanity and/or conversation mirror of FIG. 8 in an extended use position.

Referring to FIGS. 8 and 9, a vehicle sun visor 10 is illustrated having a vanity mirror assembly 20 providing a vanity and/or conversation mirror 30 that can be viewed from both the first and second sides of the visor body 12, according to a second embodiment. In this embodiment, the mirror assembly 20 is centrally located on the visor body 12 and has a larger shape suitable for use as a vanity mirror. The mirror assembly 20 has mirror 30 that may include a flat or planar mirror or may include a combination of planar and convex portions. It should be appreciated that the mirror assembly 20 as shown in FIGS. 8 and 9 is configured to extend from the second side 16 of visor body 12 and be viewed through an aperture in the visor body from the first side 14 similar to that described above in connection with the conversation mirror assembly shown in FIGS. 1-7. The mirror assembly 20 may be actuated by a user via a latch 26 to pivot to a downward use position as shown in FIG. 9 such that a driver or passenger may utilize the mirror 30 as a vanity mirror and/or a conversation mirror, while the visor body 12 is in an upward stowed position. When the visor body 12 is in the downward vertical use position, it should be appreciated that the mirror 30 may be viewed through an aperture 28 from the first side 14 of visor body 12 as shown and described in connection with the first embodiment shown in FIG. 6.

Figure 10A:
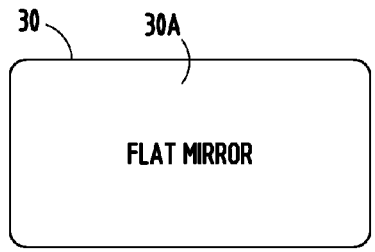
FIGS. 10A-10D are front views of different mirror configurations that may be used in the assembly shown in FIG. 9.
Figure 10B:
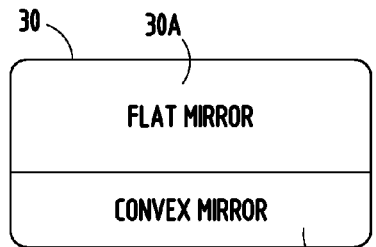
Figure 10C:
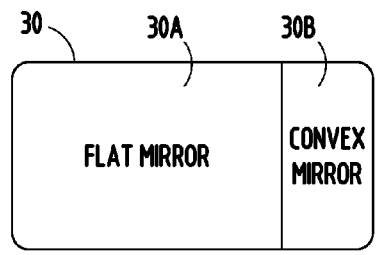
Figure 10D:
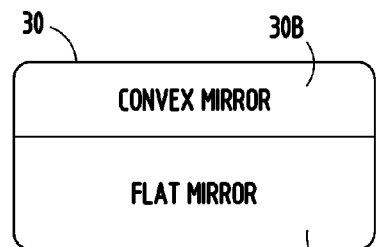

In the second embodiment shown in FIGS. 8 and 9, the mirror 30 may include a substantially planar or flat mirror as shown in FIG. 10A. A planar mirror may serve as a vanity mirror. Alternatively, the mirror 30 may include a combination of a flat mirror portion 30A and a convex mirror portion 30B as shown in various embodiments in FIGS. 10A-10D. The flat mirror portion 30A may enable that portion of the mirror 30 to be used as a vanity mirror, whereas the convex portion 30B may enable that portion of the mirror 30 to serve as a conversation mirror. By employing the convex mirror portion 30B on one side as shown in FIG. 10B, that side of the mirror 30 may provide a conversation mirror offset from the viewer. The convex mirror portion 30B may be located below the planar mirror portion 30A as shown in FIG. 10C, or above the planar mirror portion 30A as shown in FIG. 10D. The mirror 30 may be configured as a single mirror having either a planar mirror, a convex mirror, or a combination of one or more convex and planar mirror portions for use in the embodiments of FIGS. 8 and 9 and may be employed in the various other embodiments described herein.

Figure 11:
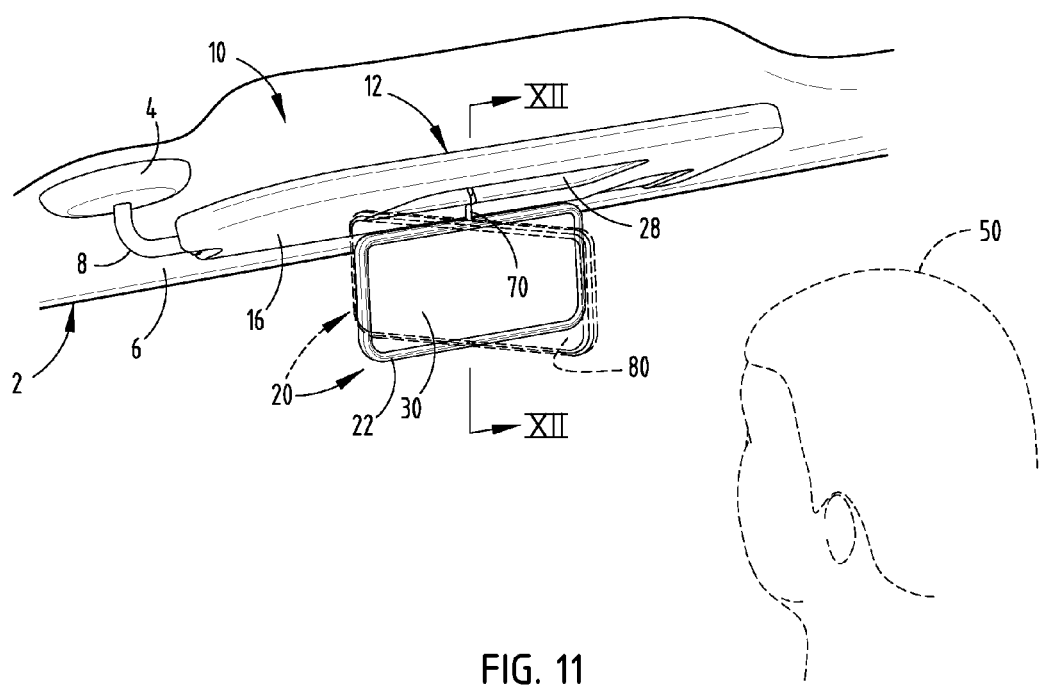
FIG. 11 is perspective view of a sun visor showing a combination vanity and conversation mirror in an extended use position, according to a third embodiment.
Figure 12:
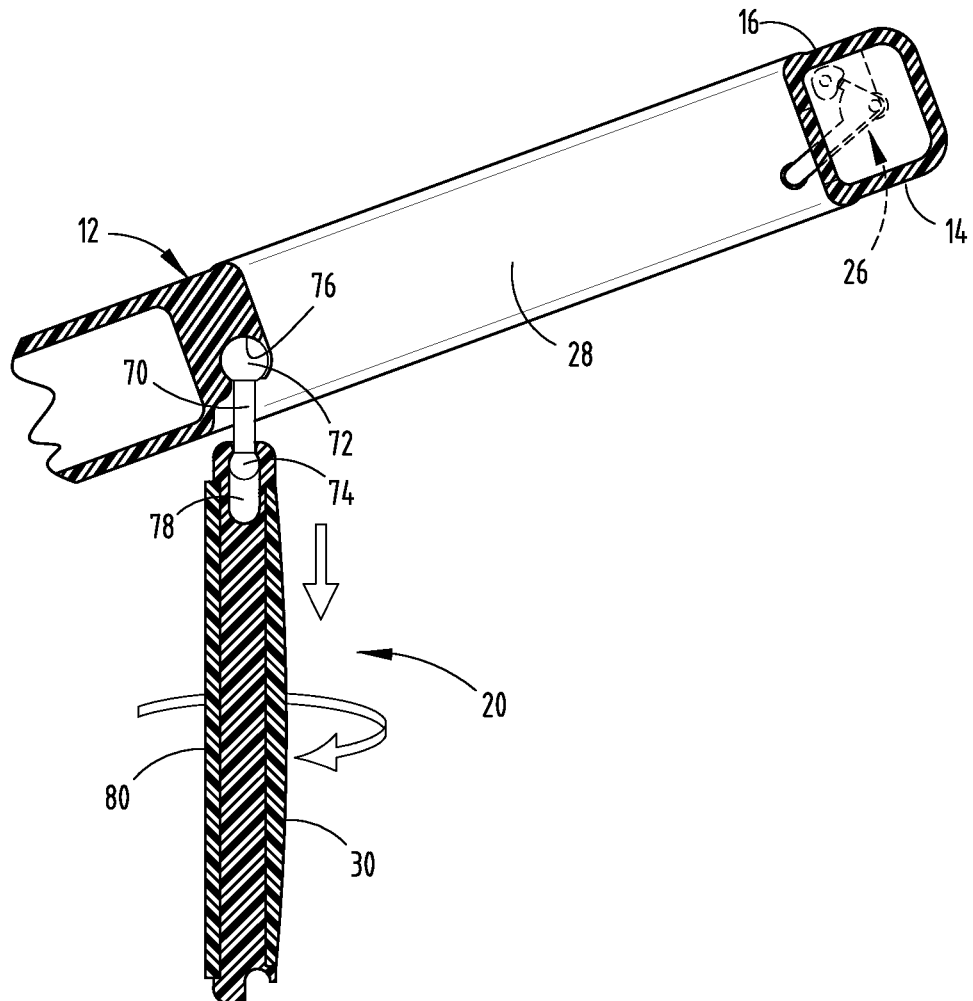
FIG. 12 is a cross-sectional view taken through lines XI-XI of FIG. 11.
Figure 13:
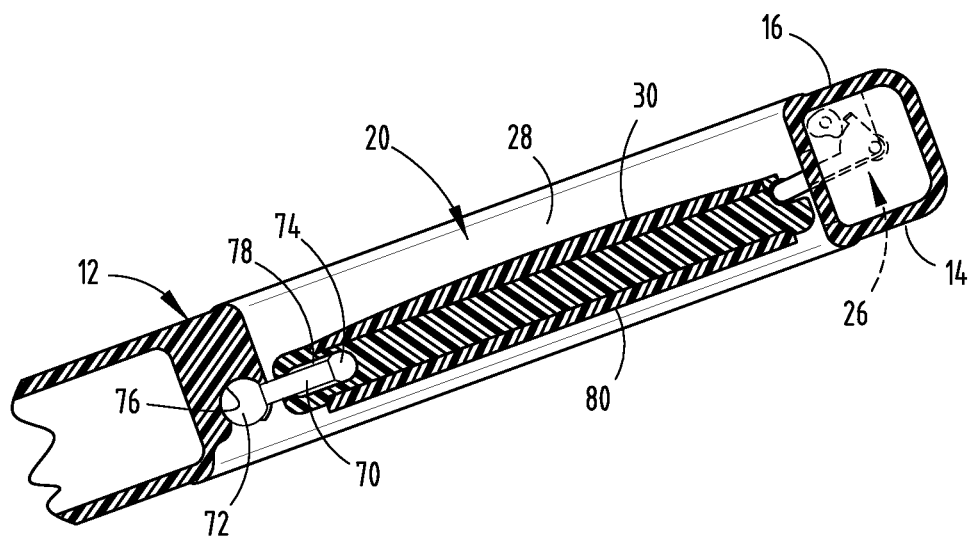
FIG. 13 is a cross-sectional view of the visor and mirror assembly of FIG. 12 shown with the mirror stowed.

Referring to FIGS. 11-13, a vehicle sun visor 10 is generally shown having a combination vanity and conversation mirror assembly 20 providing a mirror 30 according to a third embodiment. In this embodiment, the mirror assembly 20 is connected to the second side 16 of visor body 12 by way of a pivot stalk 70. Pivot stalk 70 is shown having an elongated arm 70 having spherical portions 72 and 74 on opposite ends for engaging socket 76 on visor body 12 and elongated socket 78 on frame 24, respectively. Spherical portions 72 and 74 and sockets 76 and 78 serve as ball and socket connector that allow the pivot stalk 70 to pivot about multiple axes. The pivot stalk 70 thereby enables the frame 20 and mirror 30 to pivot relative to the visor body 12 between a deployed use position shown in FIG. 12 and an upward stowed position within the second side 16 of visor body 12. The pivot stalk 70 further enables the frame 24 and mirror 30 to rotate about the axis of arm 70 and pivot about further axes such as to tilt or otherwise change the viewing angle.

In the third embodiment, the mirror assembly 20 may employ a first mirror in the form of a conversation mirror 30 on one side of frame 24 and a second mirror in the form of a substantially planar vanity mirror 80 on the opposite side of frame 24. As such, the frame 24 and mirrors 30 and 80 may be rotated about pivot stalk 70 one hundred eighty degrees (180°) to present either the convex conversation mirror 30 or the planar vanity mirror 80 for viewing by a user. An optional lid or cover could be provided on one or both mirrors 30 and 80, if desired. It should further be appreciated that the pivot stalk 70 may be employed to enable rotation of the mirror 30 for other embodiments disclosed herein.

Accordingly, various embodiments of a vehicle visor 10 are disclosed herein for providing a mirror assembly 20 that may be used as a conversation mirror, as a vanity mirror, or as a combination of a conversation and vanity mirror for use on the visor body 12. The mirror assembly 20 enables a user to utilize a conversation and/or vanity mirror 30 when the visor body 12 is in the stowed position. When sun shade is desired and the visor body is in the downward use position, the mirror 30 may be likewise used. Integration of the mirror 30 into the sun visor 12 and in use in multiple use positions of the sun visor 12 provides for an integrated assembly.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle visor comprising:
    a visor body having a first side and a second side;
    a vanity mirror assembly on the first side of the visor body; and
    a conversation mirror assembly located on the visor body, said conversation mirror assembly having a conversation mirror that articulates between a stowed position within the visor body and an extended position extending from the visor body.

2. The vehicle visor of claim 1, wherein the conversation mirror extends outward and below the visor body when the visor body is in an upward stowed position.

3. The vehicle visor of claim 2, wherein the visor body further comprises an aperture that provides a viewing window to enable a viewer to view the conversation mirror from the first side of the visor body.

4. The vehicle visor of claim 1, wherein the conversation mirror comprises a convex mirror.

5. The vehicle visor of claim 1, wherein the conversation mirror assembly comprises a latch disposed on the visor body for latching the conversation mirror stowed within the visor body.

6. The vehicle visor of claim 5, wherein the latch comprises a user depressible actuation latch.

7. The vehicle visor of claim 1 further comprising a pivot mechanism for connecting the visor body to a vehicle structure, wherein the pivot mechanism allows the visor to pivot between the stowed position and a downward use position.

8. A vehicle visor comprising:
    a visor body having a first side and a second side, wherein the visor body pivots between a stowed position and a downward use position; and
    a mirror assembly comprising a pivot stalk, a first mirror on one side, and a second mirror on an opposite side, wherein the mirror assembly is extendable from the visor body and the first and second mirrors are pivotable about the stalk.

9. The visor of claim 8, wherein the mirror assembly is extendable from the first side of the visor body by pivoting outward about a pivot mechanism, and wherein the mirror assembly is stowed within an aperture in the visor body such that the second mirror may be viewed from the second side of the visor body.

10. The visor of claim 8, wherein the mirror assembly extends outward and below the visor body when the visor body is in an upward stowed position.

11. The visor of claim 8, wherein the visor body comprises an aperture, and wherein the second mirror is viewable through the aperture from the second side of the visor body.

12. The visor of claim 8, wherein the mirror assembly further comprises a latch disposed on the visor body for latching the mirror assembly stowed within the visor body.

13. The visor of claim 8, wherein the first mirror comprises a conversation mirror.

14. The visor of claim 8, wherein the first mirror comprises a conversation mirror and the second mirror comprises a vanity mirror.

15. The visor of claim 8, wherein the second mirror comprises a vanity mirror.

16. The visor of claim 8, wherein the second mirror comprises a flat portion and a convex portion.

17. A vehicle visor comprising:
a visor body having first and second sides and pivotable between stowed and downward use positions;
a vanity mirror assembly on the visor body; and
a conversation mirror assembly located on the visor body and comprising a conversation mirror extendable from the first side of the visor body for viewing, and stowable within the visor body for viewing through an aperture from the second side of the visor body.

18. The visor of claim 17, wherein the conversation mirror is extendable from the first side of the visor body by pivoting outward about a pivot mechanism, and wherein the conversation mirror is stowed within an aperture in the visor body such that the conversation mirror may be viewed from the second side of the visor body.

19. The visor of claim 17, wherein the conversation mirror extends outward and below the visor body when the visor body is in an upward stowed position.

20. The visor of claim 17, wherein the visor body comprises an aperture, and wherein the conversation mirror is viewable through the aperture from the second side of the visor body.

21. The visor of claim 17, wherein the conversation mirror assembly further comprises a latch disposed on the visor body for latching the conversation mirror stowed within the visor body.

22. The visor of claim 17, wherein the conversation mirror has a convex shape.

23. A vehicle visor comprising:
a visor body having first and second sides and pivotable between a stowed position and a downward use position;
a vanity mirror assembly on the visor body; and
a conversation mirror assembly located on the visor body and comprising a conversation mirror extendable from the first side of the visor body for viewing, and stowable within the visor body for viewing through an aperture from the second side of the visor body, wherein the mirror assembly comprises a pivoting stalk, a first mirror on one side and a second mirror on an opposite side, wherein the first and second mirrors are pivotable about the stalk to display one of the first and second mirrors to a user.

24. The visor of claim 23, wherein the first mirror comprises a conversation mirror and the second mirror comprises a vanity mirror.

* * * * *